US012448826B2

(12) United States Patent
Adamchick et al.

(10) Patent No.: US 12,448,826 B2
(45) Date of Patent: Oct. 21, 2025

(54) ADJUSTABLE DOOR HOLDER

(71) Applicant: ASSA ABLOY ACCESSORIES AND DOOR CONTROLS GROUP, INC., Monroe, NC (US)

(72) Inventors: Daniel Adamchick, Mint Hill, NC (US); Matthew Bailey, Monroe, NC (US)

(73) Assignee: ASSA ABLOY ACCESSORIES AND DOOR CONTROLS GROUP, INC., Monroe, NC (US)

( * ) Notice: Subject to any disclaimer, the term of this patent is extended or adjusted under 35 U.S.C. 154(b) by 155 days.

(21) Appl. No.: 18/080,804

(22) Filed: Dec. 14, 2022

(65) Prior Publication Data

US 2023/0193668 A1 Jun. 22, 2023

Related U.S. Application Data

(60) Provisional application No. 63/291,160, filed on Dec. 17, 2021.

(51) Int. Cl.
*E05C 17/56* (2006.01)
*E05C 17/46* (2006.01)
*E05B 63/00* (2006.01)

(52) U.S. Cl.
CPC .............. *E05C 17/56* (2013.01); *E05C 17/46* (2013.01)

(58) Field of Classification Search
CPC .......... E05C 17/30; E05C 17/46; E05C 17/56; Y10S 292/15; Y10S 292/44; Y10S 292/60; Y10T 292/11; Y10T 292/65; Y10T 292/54; Y10T 292/546; E05B 63/0056; E05F 5/00
USPC .................................. 16/82; 403/374.3, 377
See application file for complete search history.

(56) References Cited

U.S. PATENT DOCUMENTS 1,527,981 A * 3/1925 Kimball .................. E05C 17/30 188/67
1,702,057 A 2/1929 Murray
2,140,002 A 12/1938 Dion
2,598,958 A 6/1952 Wood
2,762,641 A * 9/1956 Gilmour ............... E05C 17/443 292/338
2,801,870 A 8/1957 Davey
2,872,225 A 2/1959 Walker, Jr.
3,057,647 A 10/1962 Wood (Continued)

*Primary Examiner* — Carlos Lugo
(74) *Attorney, Agent, or Firm* — Moore & Van Allen PLLC; Jeffrey R. Gray

(57) ABSTRACT

A door holder and release assembly that is adjustable to account for different differences between the door and where the door holder and release assembly will be installed (e.g., a wall, the floor, another support location). The door holder herein has a base member, a holder member, and a connector. The base member may be configured for operative coupling with a wall or a door. The holder member may be configured for operative coupling with a release assembly on the wall or the door opposite the base member. Moreover, the holder member may be configured to be telescopically operatively coupled with the base member through the connector to position the holder member at varied distances from base member to allow for the accommodation of varying distances between a wall and the door, as well as for minor adjustments that a user may want to make.

11 Claims, 9 Drawing Sheets

(56) References Cited

U.S. PATENT DOCUMENTS

| | | | | | |
|---|---|---|---|---|---|
| 3,287,050 | A * | 11/1966 | Ferrante | E05C 17/025 | D8/402 |
| 3,477,176 | A | 11/1969 | Tansley | | |
| 3,781,047 | A | 12/1973 | Surko | | |
| 4,099,753 | A * | 7/1978 | Gwozdz | E05C 7/06 | 292/1.5 |
| 4,669,766 | A | 6/1987 | Hanchett, Jr. et al. | | |
| 4,852,919 | A | 8/1989 | Nimee et al. | | |
| 5,010,622 | A * | 4/1991 | Morita | E05C 17/56 | 292/DIG. 19 |
| 5,139,293 | A | 8/1992 | Zimmerman et al. | | |
| 5,303,944 | A * | 4/1994 | Kalmus | B62K 19/30 | 74/551.8 |
| 5,741,034 | A | 4/1998 | Bains et al. | | |
| 6,142,698 | A * | 11/2000 | Nutter | F16B 7/0426 | 403/109.1 |
| 6,149,178 | A * | 11/2000 | Bradbury | B62H 7/00 | 280/304.5 |
| 6,629,335 | B1 * | 10/2003 | Derman | E05F 5/06 | 292/DIG. 60 |
| 6,682,432 | B1 | 1/2004 | Shinozuka | | |
| 7,201,408 | B2 * | 4/2007 | Cennamo, Jr. | E05B 15/02 | 292/334 |
| 7,819,441 | B1 * | 10/2010 | Coman | E05C 17/56 | 292/DIG. 19 |
| 8,191,937 | B2 * | 6/2012 | Lin | E05C 7/06 | 292/89 |
| 10,865,835 | B1 | 12/2020 | Ciotola | | |
| 2002/0001504 | A1 * | 1/2002 | McCallion | F16B 33/006 | 403/374.3 |

* cited by examiner

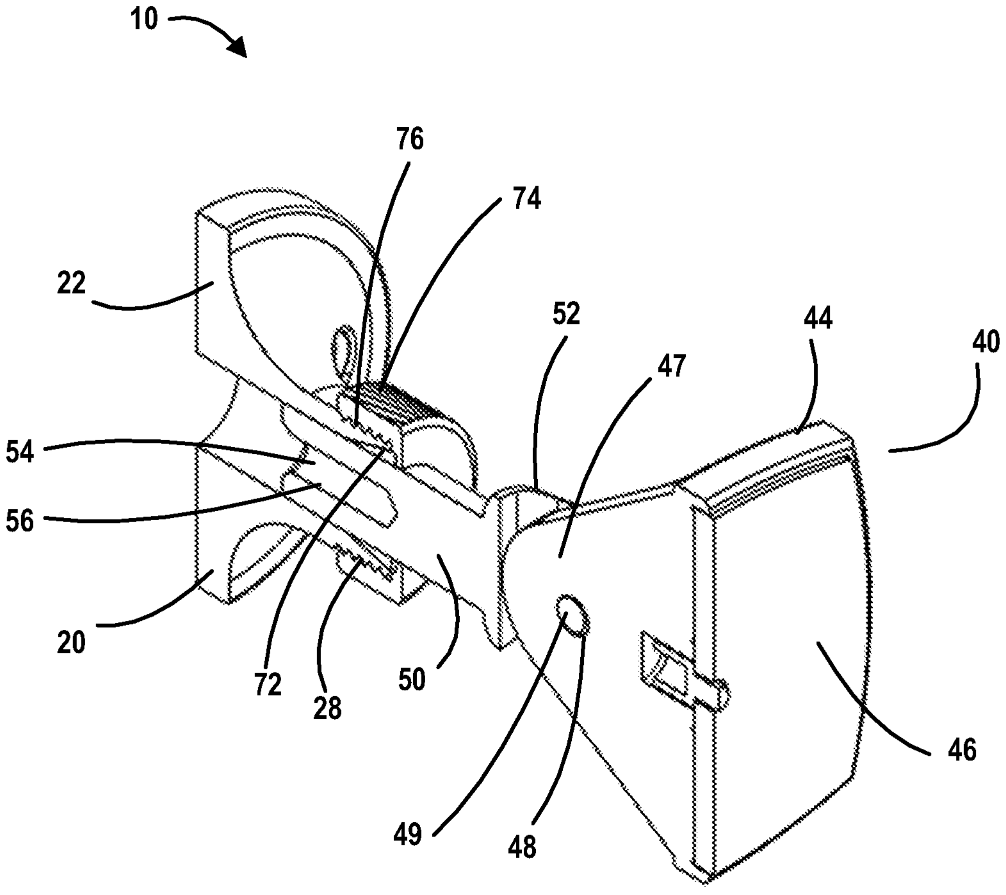
*FIG.* 3A

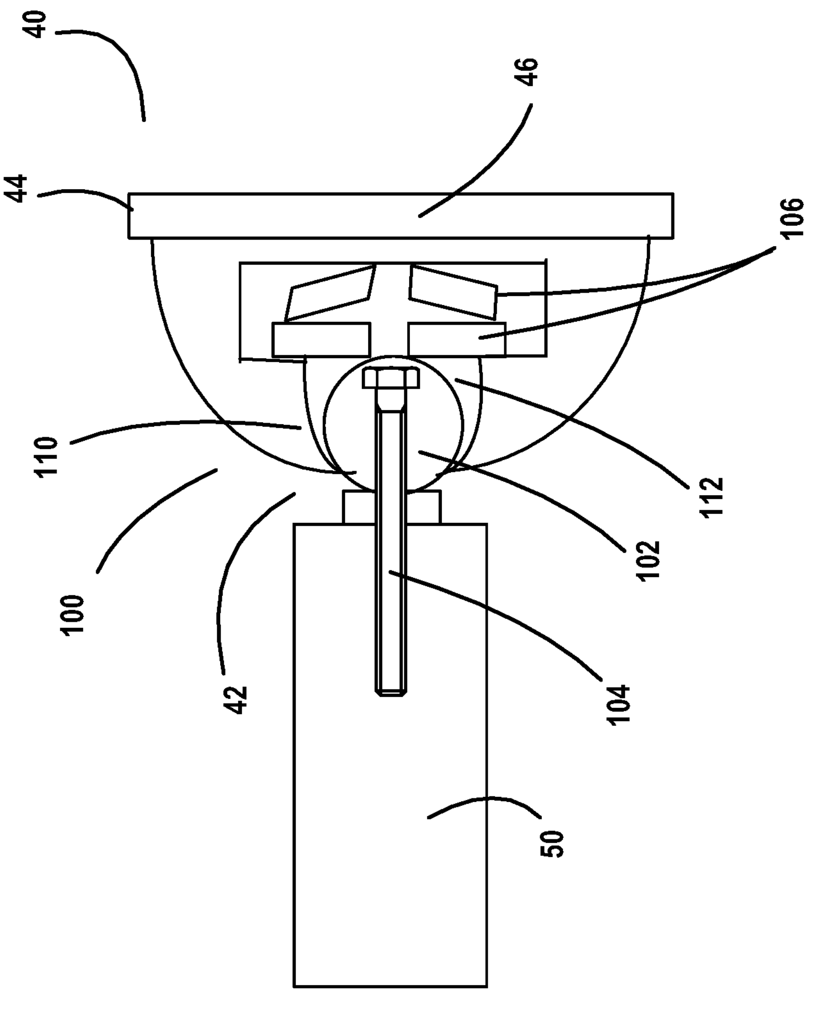
*FIG.* 3B

ADJUSTABLE DOOR HOLDER

CROSS REFERENCE AND PRIORITY CLAIM UNDER 35 U.S.C. § 119

This application claims priority to U.S. Provisional Application No. 63/291,160 entitled "Adjustable Door Holder" filed on Dec. 17, 2021, which is assigned to the assignee hereof and the entirety of which is incorporated by reference herein.

FIELD

The present invention relates to door holder and release assemblies, more particularly, a door holder and release assembly that has improved adjustability.

BACKGROUND

Door holders are used to hold a door in an open position. Door holders may be mounted in between a wall and a door, or in between the floor and a door. Door holders may be magnetically, electromagnetically, mechanically, or electromechanically operated.

SUMMARY

The embodiments of the present disclosure relate a door holder and release assembly that is adjustable to account for different differences between the door and where the door holder and release assembly will be installed (e.g., a wall, the floor, another support location). The door holder herein has a base member, a holder member, and a connector. The base member may comprise a proximal base end and a distal base end, wherein the proximal base end is configured for operative coupling with a wall, a door, or another support member. The holder member may have a proximal holder end and a distal holder end. The connector may operatively couple the proximal holder end of the holder member to the distal base end of the base member. The proximal holder end may be configured to be telescopically operatively coupled with the base member to position the distal holder end at varied distances from the proximal base end of the base member. The distal holder end of the holder member is configured for operative coupling with a release that allows the door to be held open or releases the door so that the door may be returned to a closed position. The telescopic nature between the holder member and the base member allows for the accommodation of varying distances between the door and wall (or another support surface), as well as for minor adjustments that a user (e.g., installer user, maintenance user, or the like) may want to make.

One embodiment of the invention comprises a door holder. The door holder comprises a base member having a proximal base end and a distal base end, wherein the proximal base end is configured for operative coupling with a wall or a door. The door holder further comprises a holder member having a proximal holder end and a distal holder end. The door holder further comprises a connector for operatively coupling the proximal holder end of the holder member to the distal base end of the base member. The proximal holder end is configured for being telescopically operatively coupled with the base member to position the distal holder end at different distances from the proximal base end of the base member.

In further accord with embodiments, the distal holder end of the holder member is configured to be removably operatively coupled with a release member that is operatively coupled to the wall or the door opposite of the base member.

In other embodiments, the release member is an electromechanical release.

In yet other embodiments, the distal base end of the base member comprises a base aperture and the proximal holder end is a shaft that is inserted into the base member through the base aperture.

In still other embodiments, the distal base end of the base member has external threads. The connector comprises a collar having internal threads, wherein the internal threads of the collar are operatively coupled to the external threads of the distal base end of the base member to operatively couple the shaft of the holder member to the base member.

In other embodiments, the door holder further comprises a compression member. The compression member is located between the shaft and the collar, and the collar compresses the compression member to operatively couple the shaft to the base member.

In further accord with embodiments, the door holder further comprises a shaft extender operatively coupled to the shaft. The shaft extender increases a length of the shaft to extend the position that the distal holder end is positioned from the proximal base end of the base member.

In other embodiments, the shaft extender has an extender threaded projection or an extender threaded aperture for operative coupling with the shaft having a shaft threaded projection or a shaft threaded aperture.

In yet other embodiments, the proximal holder end and the distal holder end are operatively coupled to each other with one or more degrees of freedom.

In still other embodiments, the proximal holder end of the holder member comprises a holder aperture and the distal base end is a shaft that is inserted into the holder member through the holder aperture.

In other embodiments, the proximal holder end of the holder member has external threads. The connector comprises a collar having internal threads, wherein the internal threads of the collar are operatively coupled to the external threads of the proximal holder end of the holder member to operatively coupled the shaft of the base member to the holder member.

In further accord with embodiments, the door holder further comprises a compression member. The compression member is located between the shaft and the collar, and the collar compresses the compression member to operatively couple the shaft to the holder member.

In other embodiments the door holder further comprises a shaft extender operatively coupled to the shaft. The shaft extender increases a length of the shaft to extend the position that the distal holder end is positioned from the proximal base end of the base member.

Other embodiments of the invention comprises a door holder and release assembly comprising a release member that is operatively coupled to a wall or a door. The door holder and release assembly further comprises a base member having a proximal base end and a distal base end, wherein the proximal base end is configured for operative coupling with the wall or the door opposite the release member. The door holder and release assembly further comprises a holder member having a proximal holder end and a distal holder end. The door holder and release assembly further comprises a connector for operatively coupling the proximal holder end of the holder member to the distal base end of the base member. The proximal holder end is configured for being telescopically operatively coupled with the base member to position the distal holder end at different distances from the proximal base end of the base member. The distal holder end of the holder member is removably operatively coupled with the release member.

In further accord with embodiments, the release member is an electromechanical release.

In other embodiments, the distal base end of the base member comprises a base aperture and the proximal holder end is a shaft that is inserted into the base member through the base aperture.

In yet other embodiments, the distal base end of the base member has external threads. The connector comprises a collar having internal threads, wherein the internal threads of the collar are operatively coupled to the external threads of the distal base end of the base member to operatively couple the shaft of the holder member to the base member.

In still other embodiments, the door holder further comprises a compression member, wherein the compression member is located between the shaft and the collar, and the collar compresses the compression member to operatively couple the shaft to the base member.

In other embodiments, the door holder further comprises a shaft extender operatively coupled to the shaft, wherein the shaft extender increases a length of the shaft to extend the position that the distal holder end is positioned from the proximal base end of the base member.

Other embodiments comprise a method of installing a door holder. The method comprises installing a base member having a proximal base end and a distal base end to a door or a wall, wherein the proximal base end is configured for operative coupling with the wall or the door. The method further comprises installing a holder member having a proximal holder end and a distal holder end to the base member, wherein the proximal holder end is configured for being telescopically operatively coupled with the base member to position the distal holder end at different distances from the proximal base end of the base member. The method further comprises installing a connector for operatively coupling the proximal holder end of the holder member to the distal base end of the base member.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

The following drawings illustrate embodiments of the invention and are not necessarily drawn to scale, wherein:

FIG. 3A is an cross-sectional perspective view of the door holder, in accordance with some embodiments of the present disclosure.

FIG. 3B is a cross-sectional side view of the door holder, in accordance with some embodiments of the present disclosure.

DETAILED DESCRIPTION

Embodiments of the present invention may now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Figure 1:
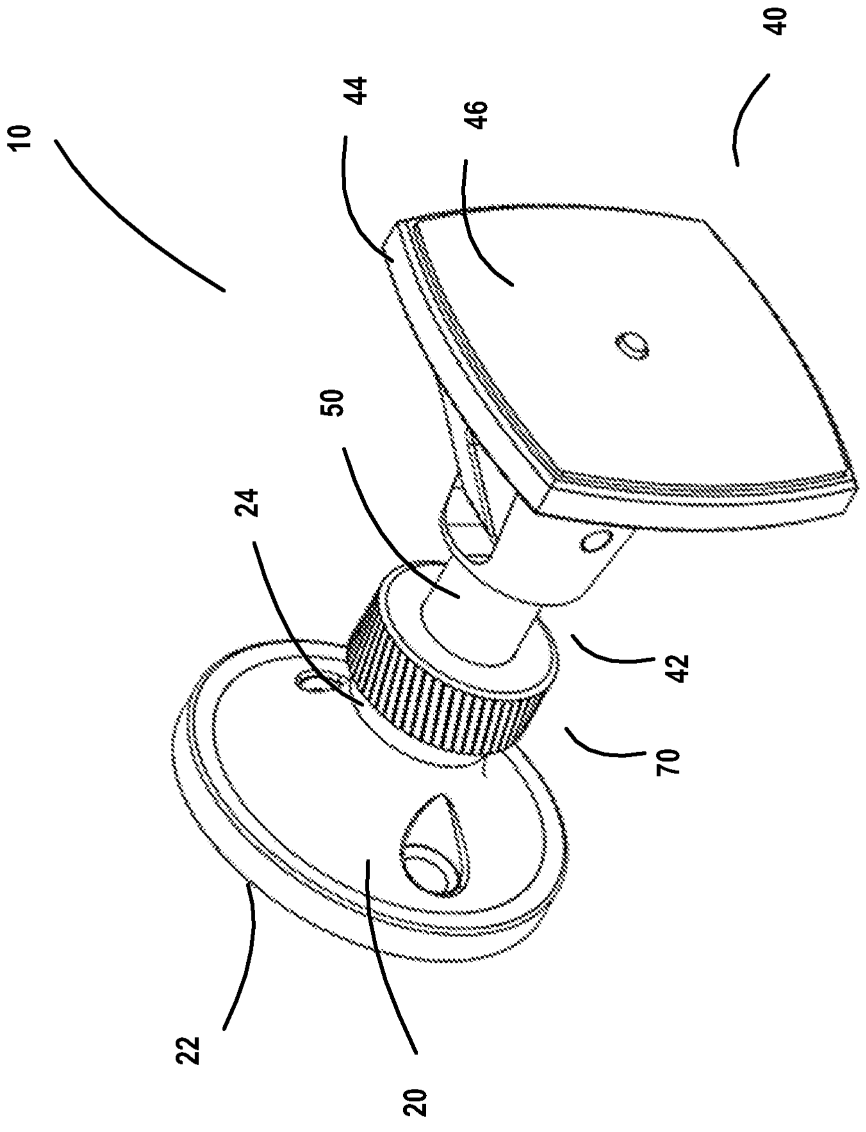
FIG. 1 is a perspective view of a door holder, in accordance with some embodiments of the present disclosure.
Figure 2:
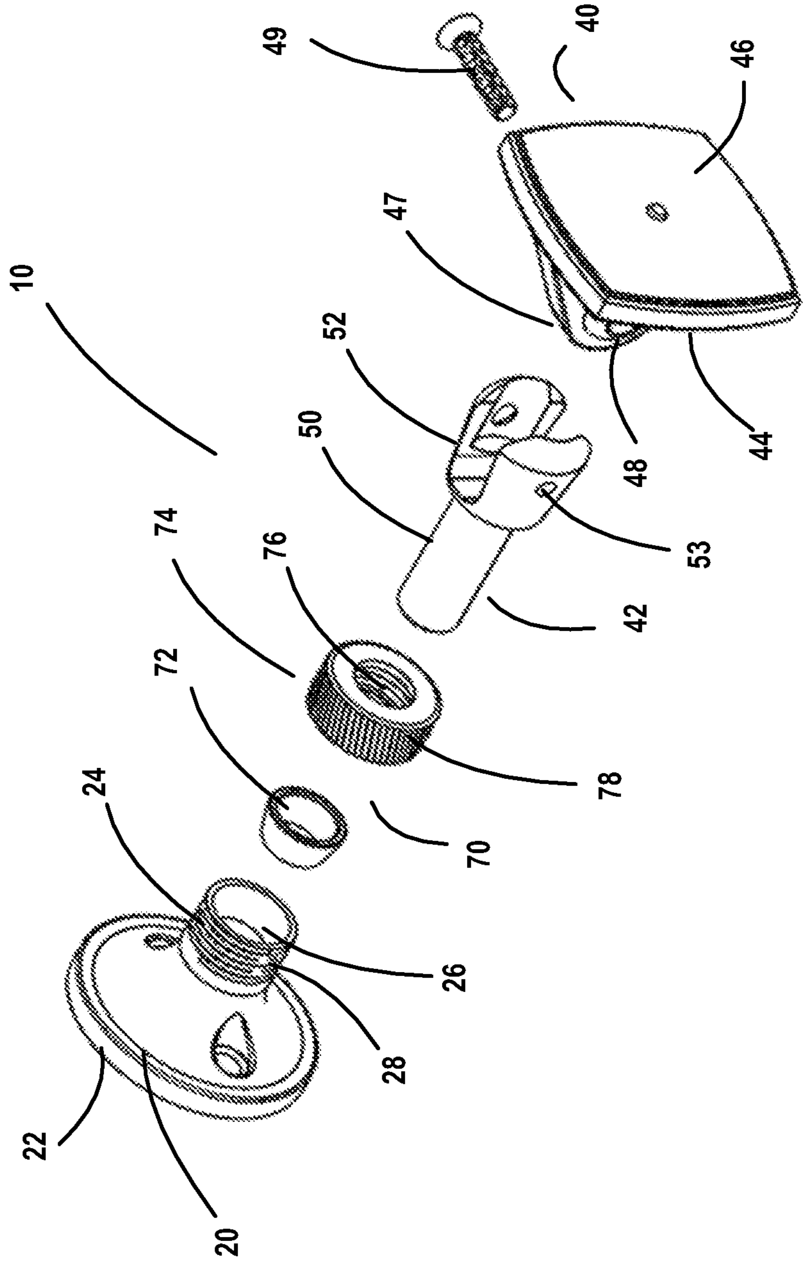
FIG. 2 is a perspective exploded view of the door holder, in accordance with some embodiments of the present disclosure.
Figure 4:
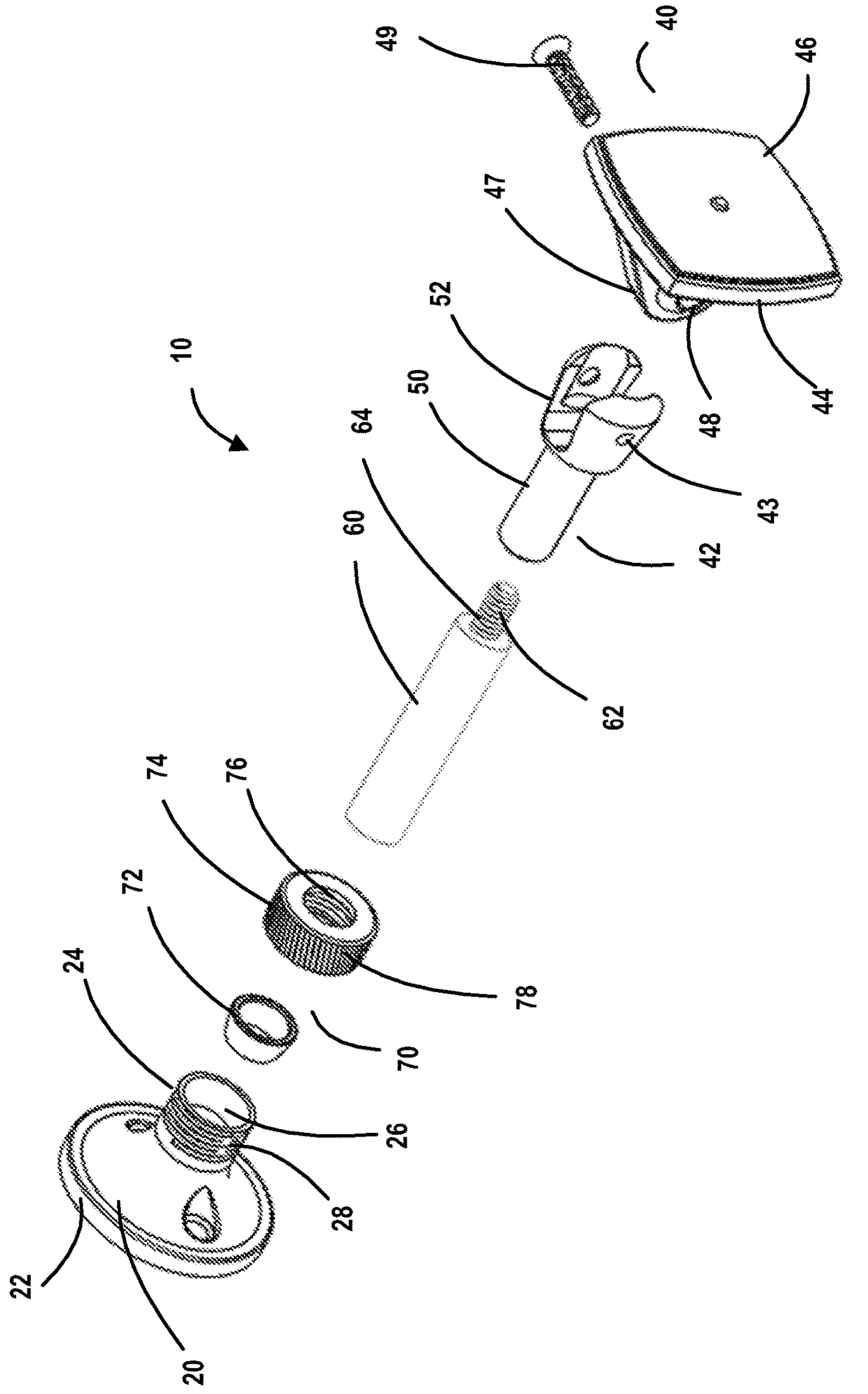
FIG. 4 is a perspective exploded view of the door holder with a shaft extender, in accordance with some embodiments of the present disclosure.
Figure 5:
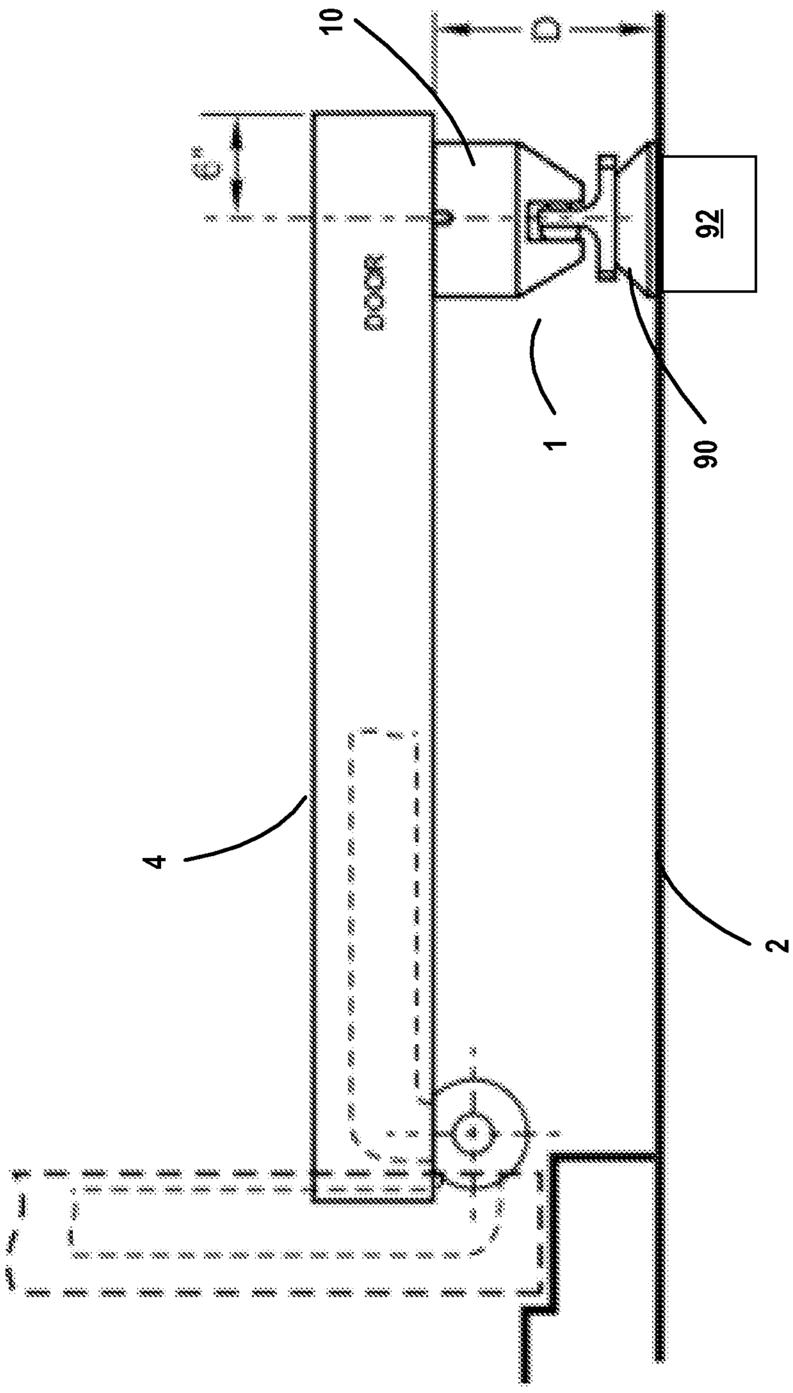
FIG. 5 is a top view of a door holder and release assembly installed on a door and wall, in accordance with some embodiments of the present disclosure.
Figure 6A:
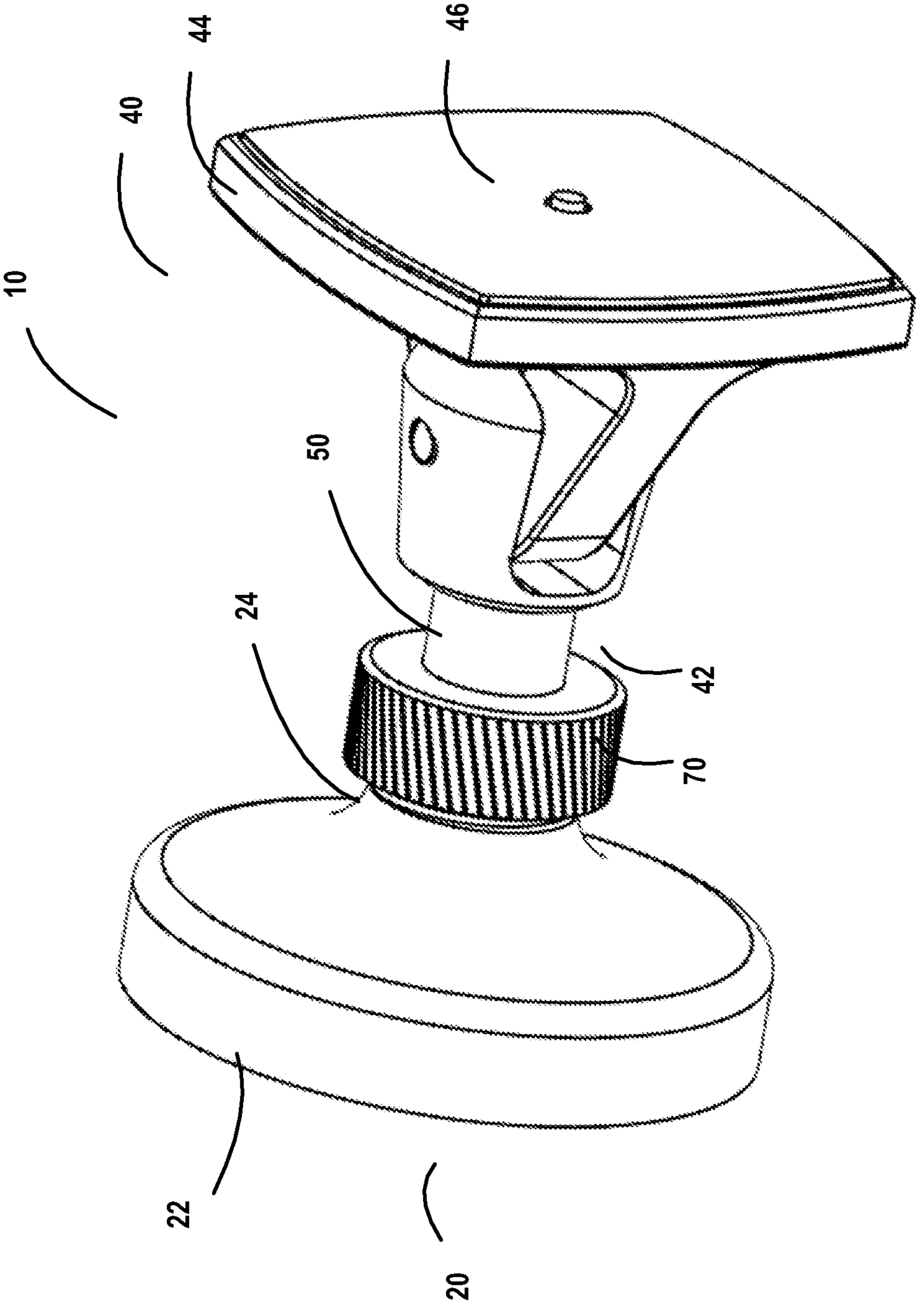
FIG. 6A is a perspective view of a door holder with the holder in a retracted position, in accordance with some embodiments of the present disclosure.
Figure 6B:
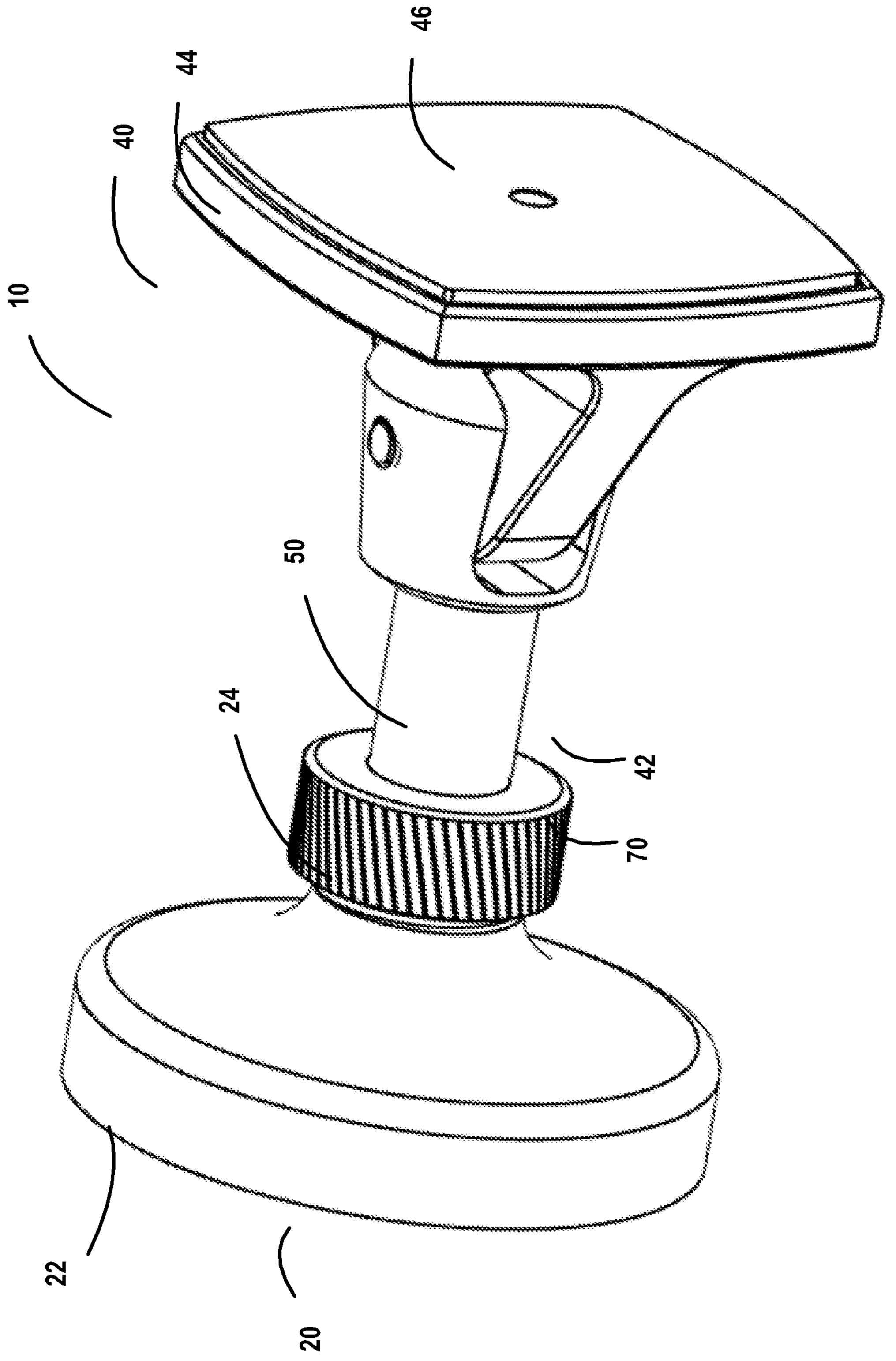
FIG. 6B is a perspective view of a door holder with the holder in an extended position, in accordance with some embodiments of the present disclosure.

FIGS. 1 through 6B illustrate a door holder 10 for use with a door holder and release assembly 1. The door holder 10 may comprise a base member 20, a holder member 40, and a connector 70. FIG. 2 illustrates a perspective exploded view of the door holder 10 illustrating the components of the door holder 10, while FIGS. 3A and 3B illustrate cross-sectional perspective views of the door holder 10 illustrating the components of the door holder 10 when assembled. Alternate embodiments of the invention are illustrated in FIG. 4 illustrating a perspective exploded view of the door holder having a shaft extender 60. FIG. 5 illustrates the door holder and release assembly 1 installed between a wall 2 and door 4. FIGS. 6A and 6B illustrate the door holder 1 in a retracted position and extended position, respectively.

As illustrated in FIGS. 1 through 4, the door holder 10 comprises a base member 20, having a proximal base end 22 and a distal base end 24, wherein the proximal base end is configured for operative coupling with a wall 2 or a door 4 (e.g., typically to a door 4) directly or indirectly (e.g., through another support member). As illustrated in FIG. 2, the distal base end 24 of the base member 20 may include a base aperture 26 (e.g., extending at least a portion of the way into the base member 20, or as through hole extending through the entirety of the base member 20). The base aperture 26 may include a hole that is enclosed (as illustrated) or a hole that has a partial opening (e.g., one or more slots down the side of distal base end 24 to allow for flexing of a portion of the distal base end 24, as will be discussed herein). Moreover, as will be described in further detail herein the distal base end 24 of the base member 20 may have external threads 28 that are used for operatively coupling with a connector 70.

The door holder 10 further comprises a holder member 40 having a proximal holder end 42 and a distal holder end 44. The proximal holder end 42 may comprise a shaft 50 and the distal holder end 44 may comprise a plate 46. The shaft 50 may be any type of shaft of any shape and/or size. For example, the shaft 50 may be a cylindrical rod (as illustrated), or may be an oval, square, rectangular, triangular, polygonal, other uniform or non-uniform shape, or the like.

As such, the proximal holder end 42 may be operatively coupled to the distal base end 24. For example, the shaft 50 may be interested into the base aperture 26 of the base member 20. As such, the proximal holder end 42 may be slidable with respect to the base member 20 to change the distance that the distal holder end 44 may be located from the proximal base end 22 of the base member 20. Moreover, the holder member 40 may be configured to be removably operatively coupled with a release 90 (i.e., otherwise described as a release member 90) that is operatively coupled to the wall 2 or the door 4 (e.g., typically to the wall 2) directly or indirectly (e.g., through another support member) opposite of the base member 20. For example, the plate 46 may be magnetic and used for operative coupling with a release 90 that is magnetic and/or electromagnetic, as will be described in further detail herein.

The door holder 10 further comprises a connector 70 for operatively coupling the proximal holder end 42 of the holder member 40 to the distal base end 24 of the base member 20. In the illustrated embodiment, the connector 70 may comprise a collar 74 that has internal threads 76 that are configured for operative coupling with the external threads 28 of the distal base end 24 of the base member 20. The collar 74 may slide over the shaft 50, and as such, when the shaft 50 is inserted into the base aperture 26, the collar 74 may be operatively coupled to the external threads 28 of the base. As previously described, in some embodiments, the distal base end 24 may have slots that allow the distal base end 24 to be compressed around the shaft 50 when the internal threads 76 of the collar 74 engage the external threads 28 of the distal base end 24. Additionally, or alternatively, the connector 70 may include a compression member 72 (e.g., a continuous ring, a discontinuous ring, or other types of members made of any type of material) that may slide over the shaft 50, but be at least partially located within the base aperture 26 of the base member 20. The compression member 72 may be comprised of rubber, silicone, elastomer, metal gasket, or the like. As such, the compression member 72 may be located between the shaft 50 and the collar 74, such that when the collar 74 is operatively coupled to the distal base end 24, the compression member 72 is squeezed around the shaft 50 to operatively couple the shaft 50 to the base member 20. The collar 74, when secured, compresses the compression member 72 to operatively couple the shaft 50 of the holder member 40 to the base member 20 (e.g., within the base aperture 26 of the distal base end 24). The collar 74 may be secured by a user twisting the collar 74 to tightly couple it to the external threads 28 of the distal base end 24 of the base member 50. The slotted distal base end 24 and/or the compression member 72 may exert a frictional force when the collar 74 is tightly secured to prevent dislocation of the shaft 50 during use of the door holder 10. In this way, a user may telescopically adjust the holder member 40 (e.g., shaft 50 at a length the user desires) with respect to the base member 20 (e.g., base aperture 26) in order to accommodate the distance from the wall 2 to the door 4 when the door 4 is in an open configuration, as will be described with respect to FIGS. 5 through 7.

In other embodiments, it should be understood that the collar 74 may be operatively coupled to the distal base end 24 of the base member 20 in other ways, such as through the use of a fastener (e.g., screw, pin, bolt, rivet, clip, or the like), through an interference fit, through a key and channel, and/or through other like connections. In still other embodiments, the connector 70 may not include a collar 74 and may operatively couple the proximal holder end 42 (e.g., the shaft 50, or the like) to the distal base end 24 (e.g., the base aperture 26, or the like) directly through the use of a fastener, or the like. In still other embodiments, the shaft 50 may have threads (e.g., external or internal) which may be used to operatively couple the shaft 50 directly or indirectly to the base member 20. For example, the shaft 50 with the threads may be screwed into the base member 20 directly. As such, it should be understood that the distance that the distal holder end 44 may be located from the proximal base end 22 of the base member 20 may be set by further screwing the shaft 50 into the base member (e.g., to reduce the distance) or unscrewing the shaft 50 from the base member 20 (e.g., to increase the distance). It should be understood that combinations of the different connectors 70 may be utilized together.

It should be further understood that the proximal holder end 42 (e.g., the shaft 50) may be moveable with respect to the distal holder end 44 (e.g., plate 46) in one or more degrees of freedom through the use of a variable joint. In the illustrated embodiment of the variable joint in FIG. 3A, the proximal holder end 42 (e.g., the shaft 50, or the like) may comprise a u-joint 52 with u-joint apertures 53 therein, while the distal holder end 44 (e.g., the plate 46, or the like) may have a mount 47 with a mount aperture 48 therein. A joint fastener 49 (e.g., pin, screw, bolt, clip, rivet, or the like) may be used to operatively couple the mount 47 with the u-joint 52 through the mount aperture 48 and the u-joint apertures 53. In other embodiments, the proximal holder end 42 may comprise the mount 47 and the distal holder end 44 may comprise the u-joint 52. In other embodiments, as illustrated in FIG. 3B, the variable joint may comprise a plug and socket joint 100. As illustrated in FIG. 3B, the proximal holder end 42 (e.g., the shaft 50, or the like) may comprise a plug 102 (e.g., a ball, oval, semi-circular, semi-oval, parabola, or other shape) that may be operatively coupled to the shaft (e.g., through the use of a plug fastener 104, such as a bolt, screw, rivet, pin, or the like). The distal holder end 44 (e.g., the plate 46, or the like) may have a socket 110 that forms a socket aperture 112, which is configured to receive the plug 102. One or more biasing members 106, such as bearings, springs, dust boots, rings, gaskets, or the like may be used within the socket aperture 112 in order to aid in supporting and/or securing the plug 102 (e.g., ball, or the like) within the socket 110, allowing the plug 102 to swivel with respect to the socket 110, and/or aiding in reducing debris (e.g., dust, particles, or the like) from entering the socket aperture 112.

While the specific connections described above are illustrated in FIGS. 3A and 3B, it should be understood that the proximal holder end 42 and the distal holder end 44 may be operatively coupled through any type of connection. For example, the proximal holder end 42 and the distal holder end 44 may be operatively coupled through other types of variable joints, such as two mounts (e.g., plates with a fastener) positioned side by side (e.g., one degree of freedom), through a universal coupling (e.g., multiple degrees of freedom), through other types of ball joints (e.g., multiple degrees of freedom), or the like. The connection between the holder proximal end 42 and the holder distal end 44 may allow for varied degrees of freedom to improve the connection between the holder member 40 and the release 90. In other embodiments, the connection between the holder member 40 and the release 90 may be a static joint instead of a variable joint. As such, it should be understood that the variable joint may be located within the holder member 40, within shaft 50 itself, within the base member 20, between these members, and/or between combinations thereof.

FIG. 4 illustrates an alternative embodiment of the door holder 10 in which one or more shaft extenders 60 may be used with the shaft 50 to allow for additional adjustability in holder member 40. When the distance between a door 4 and a wall 4 exceeds the length of the base member 20 and the proximal member 40 (e.g., including the shaft 50, or the like), the shaft extender 60 may be incorporated into the door holder 10 in order to increase the length of the door holder 10. The shaft extender 60 may be operatively coupled to the shaft 50, such that the shaft extender 60 increases the length of the shaft 50 in order to extend the position that the distal holder end 44 may be positioned from the proximal base end 22 of the base member 20. In the illustrated embodiments, the shaft extender 60 may have an extender projection 62 with external extender threads 64, and the shaft 50 may have an internal aperture 54 with internal shaft threads 56 that are configured for operative coupling with the extender threads 64 of the extender projection 62. In alternate embodiments, the shaft extender 60 may have an extender internal threaded aperture for operative coupling with the shaft 50 having a shaft threaded projection. In other embodiments, the shaft extender 60 may be operatively coupled to the shaft 50 in other ways, such as but not limited to a fastener (e.g., a set screw, a counter sunk screw, or the like), a key and channel lock, interlocking fingers, or other like connection.

FIG. 5 illustrates a door holder and release assembly 1 having a door holder 10 operatively coupled to a door 4 and a release 90 operatively coupled to a wall 2. The release 90 may be a magnetic release (e.g., works with a metal door holder, a magnetic door holder, or the like), an electromagnetic release (e.g., works with a metal door holder and is made magnetic or non-magnetic through the use of an electric current provided by a power supply 92), a mechanical connector (e.g., mechanical connection between the door holder 10 and the release 90), an electromechanical release (e.g., is connected and released through the use of an electric current provided by a power supply 92), and/or other like connection. As such, in some embodiments, instead of being a magnetic or electromagnetic connection between the door holder 10 and the release 90, it should be understood that the connection may be made through a hook, latch, clip, fastener, or the like with an loop, roller, catch, strike, or other like mechanical connection. It should be further understood that while the release 90 is illustrated as being operatively coupled to a wall 2, the release 90 could be operatively coupled to floor. Alternatively, or additionally, while the release 90 is illustrated as being operatively coupled to the wall 2, the release 90 could be operatively coupled to the door 4 and the door holder 10 could be operatively coupled to the wall 2 or the floor. As previously discussed herein, the door holder 10 and/or the release 90 could be operatively coupled to a support member instead of the wall 2 and/or the door 4.

As illustrated in FIGS. 5, 6A, and 6B, the distance D between the wall 2 (or other support member) and the door 4 when the door holder 10 is engaged with the release 90 may be adjusted by the changing the distance between the distal base end 24 of the base member 20 and the distal holder end 44 of the holder member 40. For example, FIG. 6A illustrates the door holder 10 in a retracted position in which the door holder member 40 is operatively coupled to the base member 20 in order to reduce the distance D between the wall 2 and the door 4. Alternatively, as illustrated in FIG. 6B, the door holder is located in an extended position (of or one more extended positions) in which the door holder member 40 is operatively coupled to the base member 40 in order to increase the distance D between the wall 2 and the door 4. As such, the proximal holder end 42 is configured for being telescopically operatively coupled with the base member 20 to position the distal holder end 44 at different distances from the proximal base end 22 of the base member 20. While the figures illustrates that the shaft 50 is part of the holder member 40 and the aperture 26 is part of the base member 40 to allow for the adjustment between the base member 20 and the holder member 40, it should be understood that the base member 20 may have the shaft 50 while holder member 40 has a holder aperture that receives the shaft 50 of the base member 20. In other embodiments the base member 20 and the holder member 40 may both have shafts, which may be telescopically operatively coupled to each other. As such, different connections between the holder member 40 and base member 20 may be used to allow for the adjustment between the members 20, 40.

Figure 7:
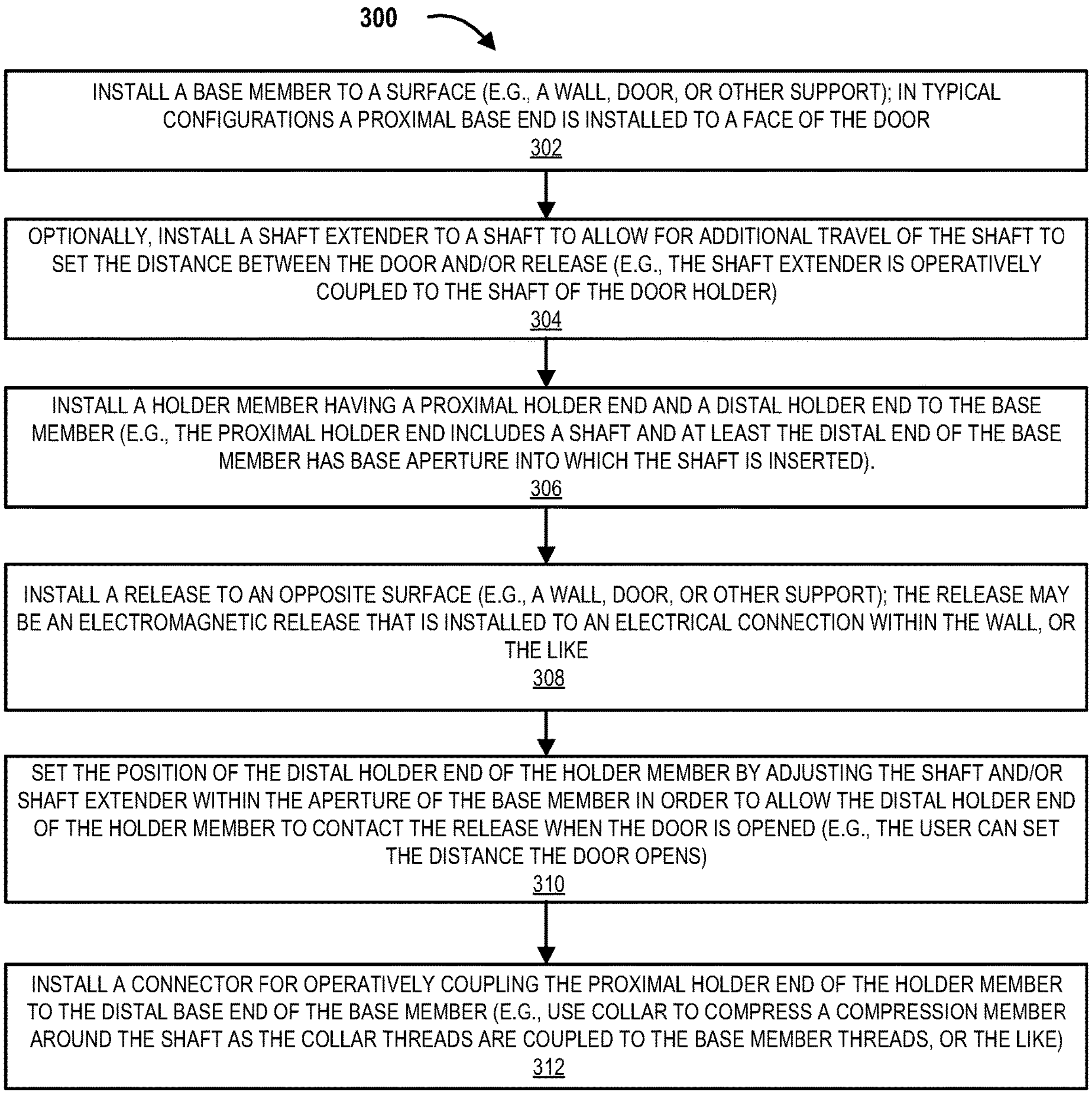
FIG. 7 is a process flow for installing the door holder and release assembly, in accordance with some embodiments of the present disclosure.

FIG. 7 illustrates a process 300 of installing the door holder and release assembly 1 described herein. It should be understood that the installation steps of the process 300 described herein may be performed in any order depending on the installer or the location on the door 4 and/or wall 2, floor, or other support member on which the door holder and release assembly 1 is being installed.

As illustrated in block 302, the base member 20 having a proximal base end 22 and a distal base end 24 is operatively coupled to a surface (e.g., a door 4, a wall 2, a floor, or other like support). The base member 20 may be fastened to the surface (e.g., the wall 2, the door 4, the floor, or the like) through one or more fasteners (e.g., screws, or the like). Additionally, or alternatively, in some embodiments, the base member 20 may be adhered to the surface (e.g., wall 2, door 4, or the like) with an adhesive. It should be understood that in typical embodiments, the proximal base end 22 of the base member 20 is operatively coupled to a face of the door 4.

FIG. 7 further illustrates in block 304 that the shaft extender 60 is optionally operatively coupled to the shaft 50 (e.g., the shaft 50 of the holder member 40) in order to increase the adjustability of the door holder 10. As previously discussed herein, the shaft extender 60 allows for additional travel of the shaft 50 to set the distance between the door 4 and the release 90.

Block 306 of FIG. 7 further illustrates that the holder member 40 is operatively coupled to the base member 20. For example, the proximal holder end 42 includes a shaft 50 and at least the distal base end 24 has a base aperture 26 that is configured to receive at least a portion of the shaft 50.

FIG. 7 further illustrates in block 308 that the release 90 is operatively coupled to a wall 2 or a door 4 opposite the of the door holder 10. As previously discussed herein, the release may be any type of release; however, in some embodiments, the release 90 is an electromagnetic release 90 that is operatively coupled to a power source 92, such as a wired connection that provides current to activate and deactivate the electromagnetic connection between the door holder 10 and the release 90.

FIG. 7 further illustrates in block 310 that the position of the distal holder end 44 of the holder member 40 is set by adjusting the shaft 50 (e.g., alone or having the shaft extender 60) within the aperture 26 (e.g., of the base member 20, or the like) in order to allow the distal holder end 44 of the holder member 40 to contact the release 90 when the door 4 is opened. The proximal holder end 42 (e.g., the shaft 50, shaft extender 60, or the like) is configured for being telescopically operatively coupled with the base member 20 to position the distal holder end at different distances from the proximal base end 22 of the base member 20. The different distances may be set depending on the distance between the wall 2 and door 4 when the door 4 is in an open configuration.

As illustrated in block 312, a connector 70 is used to operatively couple the proximal holder end 42 of the holder member 40 to the distal base end 24 of the base member 20 to aid in preventing the holder member 40 from moving with respect to the base member 20. For example, should the connector 70 comprise a collar 74 having internal threads 76, the internal threads 76 of the collar 74 are operatively coupled to the external threads 28 of the distal base end 24 of the base member 20 to operatively couple the shaft 50 of the holder member 40 to the base member 20. The connector 70 may further comprise a compression member 72, wherein the compression member 72 is located between the shaft 50 and the collar 74, and the collar 74 compresses the compression member 72 to operatively couple the shaft 50 to the base member 20.

Should a user want to adjust the position of the door 4 when it is open (e.g., the distance between the open door 4 and the wall 2, or the like), the user may loosen the collar 74, telescopically extend or reduce the length of the shaft 50 by pulling or pushing the shaft 50, and then tightening the collar 74 once the desired length is achieved. The tightening of the collar 74 will cause a compression of the compression member 60 and/or of a slotted base end 24 to exert a clamping force on the shaft 50, which locks the user's desired shaft length in place.

During construction of a structure, the location of door and/or wall may not always be uniform and/or be determined when purchasing door holders 10 for the doors 4 of the structure. That is, due to tolerance stack-ups, materials having different thicknesses, construction installation issues, or the like, one standard size door holder may not be able to be used within a structure. As such, when typical door holders are utilized, a number of interchangeable parts may be required to be purchased and sent to the site in order to allow the installers to properly install the door holders, and in particular, to properly install electromagnetic door holders that are dependent on the location of an electrical connection (e.g., outlet box, wires, or the like). For example, shafts of different sizes may be required to be sent with the door holders and/or may require cutting (e.g., which may require power tools, or the like) in order to account for different distances between the walls 2 and doors 4 of the structure. Moreover, typical door holders fail to account for minor adjustments that may be required in order to install the door holders properly. It should be understood that the door holder 10 of the present invention allows for improved installation and operation of the door holder 10. The door holders 10 of the present embodiments provide for ease of installation, a reduction in the number of shafts that have to be provided (and thus, a reduction in waste), and/or flexibly in changing the location to which the door may open (e.g., the distance between a wall 2 and the door 4). The door holder 10 may also be easily adjusted by an installer, for example, between the door 4 and the wall 2 without expert knowledge and without the need to use multiple shafts and/or without the need to cut shafts to size.

It should be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa.

In addition, where possible, any terms expressed in the singular form herein are meant to also include the plural form and/or vice versa, unless explicitly stated otherwise. Accordingly, the terms "a" and/or "an" shall mean "one or more." It will be further understood that the terms "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and should not be interpreted in an idealized or overly formal sense unless expressly so defined herein. Certain terminology is used herein for convenience only and is not to be taken as a limitation on the invention. For example, words such as top, bottom, front, rear, side, upper, lower, left, right, horizontal, vertical, upward, downward, first, second, third, inside, outside, or other similar terms used herein are intended for illustrative purposes only and do not limit the embodiments in any way. The referenced components may be oriented in any orientation other than that shown in the drawings and the terminology, therefore, should be understood as encompassing such variations unless specified otherwise. All structural and functional equivalents to the elements of the various aspects described throughout the disclosure that are known or later come to be known to those of ordinary skill in the art are expressly incorporated herein by reference and are intended to be encompassed by the claims.

It should be understood that "operatively coupled," when used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A door holder comprising:

a base member having a proximal base end and a distal base end, wherein the proximal base end is configured to be operatively coupled with a wall or a door; and wherein the distal base end of the base member comprises a base aperture and external threads;

a holder member having a proximal holder end and a distal holder end, wherein the proximal holder end is a shaft with an internal threaded shaft aperture;

a shaft extender having a threaded extender projection at a distal extender end with a projection width that is less than a shaft extender width, wherein the shaft extender is operatively coupled to the shaft through the extender projection located completely within the internal threaded shaft aperture, and wherein an outer surface of the shaft extender and the outer surface of the shaft meet to increase a length of the shaft, wherein a proximal extender end is configured to define an internal threaded aperture for receiving an additional shaft extender when necessary;

a connector comprising a collar having internal threads for operatively coupling the proximal holder end of the holder member to the distal base end of the base member; and a compression member, wherein the compression member is located at least partially around the shaft or the shaft extender when the shaft extender is used;

wherein the proximal holder end is configured to be telescopically operatively coupled with the base member through the connector by sliding the shaft or the shaft extender within the base aperture to position the distal holder end at different distances from the proximal base end of the base member; and wherein the internal threads of the collar are operatively coupled to the external threads of the distal base end of the base member and configured to compress the compression member to operatively couple the shaft or shaft extender to the base member.

2. The door holder of claim 1, wherein the distal holder end of the holder member is configured to be removably operatively coupled with a release member that is operatively coupled to the wall or the door opposite of the base member.

3. The door holder of claim 2, wherein the release member is an electromechanical release.

4. The door holder of claim 1, wherein the proximal holder end and the distal holder end are operatively coupled to each other with one or more degrees of freedom.

5. A door holder and release assembly comprising:

a release member that is operatively coupled to a wall or a door;

a base member having a proximal base end and a distal base end, wherein the proximal base end is operatively coupled with the wall or the door opposite the release member, and wherein the distal base end of the base member comprises a base aperture and external threads;

a holder member having a proximal holder end and a distal holder end, wherein the proximal holder end is a shaft with an internal threaded shaft aperture;

a shaft extender having a threaded extender projection at a distal extender end with a projection width that is less than a shaft extender width, wherein the shaft extender is operatively coupled to the shaft through the extender projection located completely within the internal threaded shaft aperture, and wherein an outer surface of the shaft extender and the outer surface of the shaft meet to increase a length of the shaft, wherein a proximal extender end is configured to define an internal threaded aperture for receiving an additional shaft extender when necessary;

a connector comprising a collar having internal threads for operatively coupling the proximal holder end of the holder member to the distal base end of the base member; and a compression member, wherein the compression member is located at least partially around the shaft or the shaft extender when the shaft extender is used;

wherein the proximal holder end is telescopically operatively coupled with the base member through the connector by sliding the shaft or the shaft extender within the base aperture to position the distal holder end at different distances from the proximal base end of the base member;

wherein the internal threads of the collar are operatively coupled to the external threads of the distal base end of the base member to compresses the compression member to operatively couple the shaft or shaft extender to the base member; and wherein the distal holder end of the holder member is removably operatively coupled with the release member.

6. The door holder and release assembly of claim 5, wherein the release member is an electromechanical release.

7. The door holder and release assembly of claim 5, wherein the proximal holder end and the distal holder end are operatively coupled to each other with one or more degrees of freedom.

8. A method of installing a door holder, the method comprising:

installing a base member having a proximal base end and a distal base end to a door or a wall, wherein the distal base end of the base member comprises a base aperture and external threads;

installing a shaft extender to a shaft of a holder member, wherein the holder member comprises a proximal holder end and a distal holder end, wherein the distal holder end is the shaft having an internal threaded shaft aperture, wherein the shaft extender has a threaded extender projection at a distal extender end with a projection width that is less than a shaft extender width, and wherein the shaft extender is operatively coupled to the shaft through the extender projection located completely within the internal threaded shaft aperture, and wherein an outer surface the shaft extender and the outer surface of the shaft meet to increase a length of the shaft, wherein a proximal extender end is configured to define an internal threaded aperture for receiving an additional shaft extender when necessary;

installing the holder member to the base member by telescopically sliding the shaft or the shaft extender within the base aperture to position the distal holder end at a distance from the proximal base end of the base member;

installing a compression member at least partially around the shaft or the shaft extender when the shaft extender is used; and installing a connector comprising a collar having internal threads for operatively coupling the proximal holder end of the holder member to the distal base end of the base member;

wherein the internal threads of the collar are operatively coupled to the external threads of the distal base end of the base member to compress the compression member to operatively couple the shaft or shaft extender to the base member.

9. The method of claim 8, wherein the distal holder end of the holder member is configured to be removably operatively coupled with a release member that is operatively coupled to the wall or the door opposite of the base member.

10. The method of claim 9, wherein the release member is an electromechanical release.

11. The method of claim 8, wherein the proximal holder end and the distal holder end are operatively coupled to each other with one or more degrees of freedom.

* * * * *